(12) United States Patent
Shintani

(10) Patent No.: US 8,619,200 B2
(45) Date of Patent: Dec. 31, 2013

(54) TELEVISION START SPEED ENHANCEMENT

(71) Applicant: Sony Corporation, Tokyo (JP)

(72) Inventor: Peter Rae Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/941,857

(22) Filed: Jul. 15, 2013

(65) Prior Publication Data

US 2013/0300942 A1    Nov. 14, 2013

Related U.S. Application Data

(62) Division of application No. 13/418,583, filed on Mar. 13, 2012, now Pat. No. 8,531,612.

(51) Int. Cl.
*H04N 5/63* (2006.01)
*H04N 5/50* (2006.01)

(52) U.S. Cl.
USPC .......................................... 348/730; 348/731

(58) Field of Classification Search
USPC .................................. 348/730, 725, 731–733
IPC ........................................ H04N 5/63,5/44, 5/50
See application file for complete search history.

(56) References Cited

U.S. PATENT DOCUMENTS

| | | | |
|---|---|---|---|
| 5,153,580 A * | 10/1992 | Pollack | 348/730 |
| 6,788,352 B2 | 9/2004 | Kim | |
| 7,353,378 B2 | 4/2008 | Vaszary et al. | |
| 7,636,934 B2 | 12/2009 | Baldwin et al. | |
| 7,681,028 B2 | 3/2010 | Stalker et al. | |
| 8,204,367 B2 | 6/2012 | Leung et al. | |
| 2006/0242665 A1 | 10/2006 | Knee et al. | |
| 2008/0022313 A1 | 1/2008 | Yoshioka | |
| 2008/0060012 A1 | 3/2008 | Rydenhag | |
| 2011/0030007 A1 | 2/2011 | Cho | |

OTHER PUBLICATIONS

Nguyen, Chau, Alarm Feature for Sony TV, Sony Corporation, ip.com Prior Art Database No. IPCOM000154714D, Published Jul. 12, 2007.
Restriction Requirement, U.S. Appl. No. 13/418,583, Apr. 11, 2013.
Notice of Allowance and Fees Due, U.S. Appl. No. 13/418,583, May 23, 2013.

* cited by examiner

*Primary Examiner* — Sherrie Hsia
(74) *Attorney, Agent, or Firm* — Miller Patent Services; Jerry A. Miller

(57) ABSTRACT

A television receives a command to power up from a standby mode. This causes the TV to start a boot process, and while the boot process proceeds. At a point in the boot process when the tuner input switch is operative, the process simultaneously determines a current time from a real time clock and retrieves a channel and a switch setting from a usage pattern database corresponding to the current time. The tuner is tuned to the channel and the input switch is set. At completion of the boot process the tuner is already tuned to the channel and the input switch is set to the switch setting corresponding the current time so that time to viewing a desired channel is often minimized. This abstract is not to be considered limiting, since other embodiments may deviate from the features described in this abstract.

25 Claims, 5 Drawing Sheets

TELEVISION START SPEED ENHANCEMENT

CROSS REFERENCE TO RELATED DOCUMENTS

This application is a divisional application of U.S. patent application Ser. No. 13/418,583, filed Mar. 13, 2012, now U.S. Pat. No. 8,531,612, which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

When a television receiver device is turned off via a remote controller, it is generally only placed in a lower power consumption standby mode in which the remote control receiver remains active and several other functions such as a real-time clock may remain active. However, users commonly refer to this state as "off" despite the power consumption not actually being zero.

Due to the increasing complexity of television (TV) sets, the startup time for a user to get from the off (standby) state to a desired channel and/or input (including boot time and time to navigate to the desired channel and input) has increased. Prior generations of television sets often utilized embedded assembler and other techniques to control the TV processor that operated very quickly resulting a quick boot up time. However, the complexity of current and future generations of television sets make use of such techniques unmanageable. As a result, TV sets are now being developed to utilize a Linux kernel and higher level programming in order to implement the many complex features of a television. This in turn makes advanced features easier to implement, but unfortunately results in the TV not being fully responsive for several minutes. The problem is compounded with digital TV which not only requires a tuner to tune to a particular frequency, but also requires filtering by packet identifier to obtain the proper data stream for a major and minor channel, and audio and video decoding of the channel's data stream to begin before a channel actually appears tuned to the user. Hence, a user could actuate the power switch and not be able to actually view a desired channel or input for several minutes.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
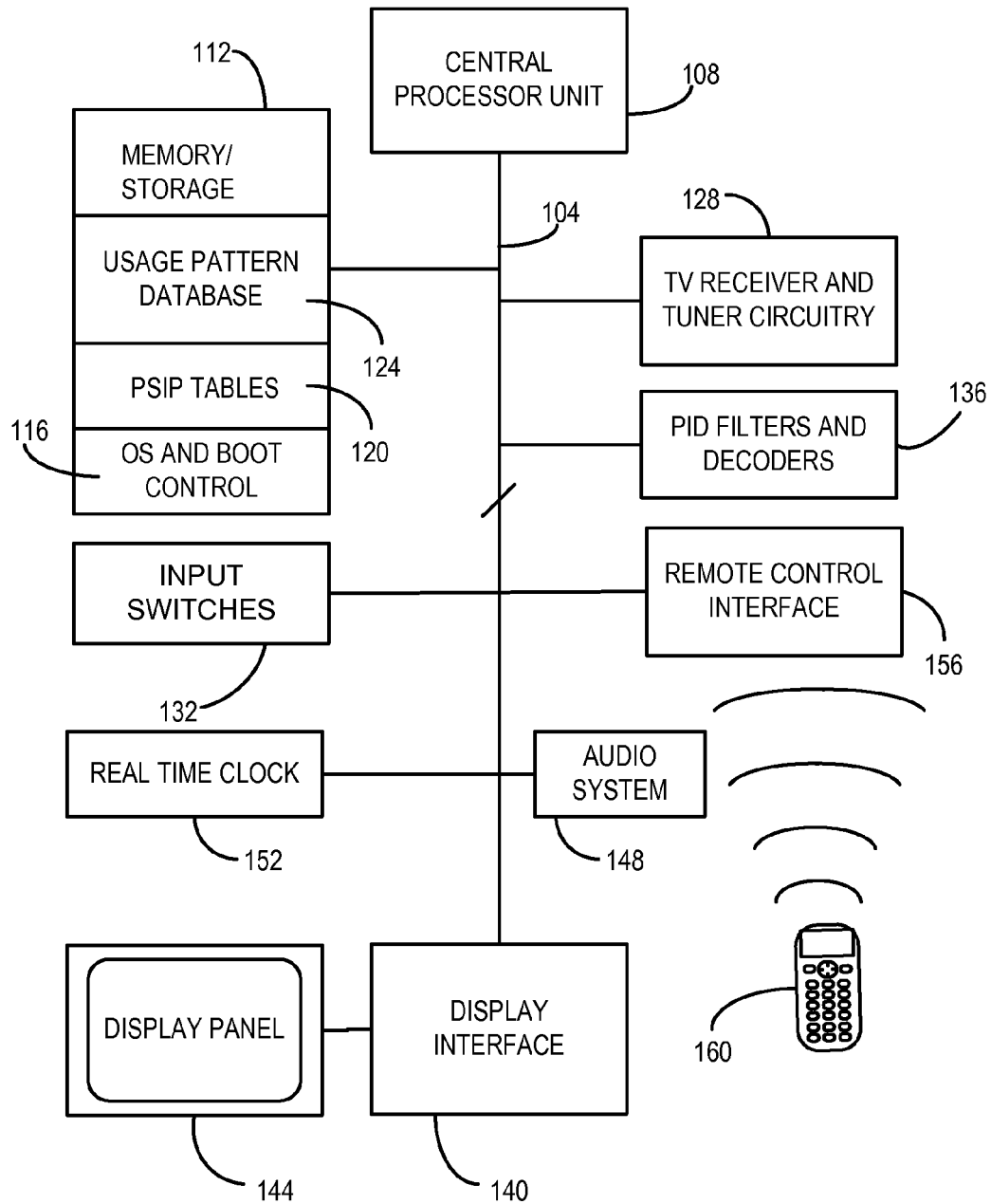
FIG. 1 is an example simplified block diagram of a television receiver device consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program" or "show". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As previously noted, when a television receiver device is turned off via a remote controller, it is generally only placed in a lower power consumption standby mode in which the remote control receiver remains active and several other functions such as a real-time clock may remain active. However, users commonly refer to this state as "off" despite the power consumption not actually being zero. For purposes of this document, the terms "off" and "standby" may be used somewhat synonymously unless the context makes it clear that one actual state or the other is intended.

Due to the increasing complexity of television (TV) sets, the startup time for a user to get from the off (standby) state to a desired channel and/or input (including boot time and time to navigate to the desired channel and input) has increased. Prior generations of television sets often utilized embedded assembler and other techniques to control the TV processor that operated very quickly resulting a quick boot up time. However, the complexity of current and future generations of television sets make use of such techniques unmanageable. As a result, TV sets are now being developed to utilize a Linux kernel and higher level programming in order to implement the many complex features of a television. This in turn makes advanced features easier to implement, but unfortunately results in the TV not being fully responsive for several minutes. The problem is compounded with digital TV which not only requires a tuner to tune to a particular frequency, but also requires filtering by packet identifier to obtain the proper data stream for a major and minor channel, and audio and video decoding of the channel's data stream to begin before a channel actually appears tuned to the user. For purposes of this document, all actions needed to place the TV in a state capable of tuning and filtering and decoding a selected channel is considered "tuning". Hence, a user could actuate the power switch and not be able to actually view a desired channel or input for several minutes.

This problem can be ameliorated by recognizing that a TV user's usage pattern is often quite simple. For example, in the evening the user may often watch a movie or a late news cast. In the morning the user will often watch the same news program every morning on the same channel. In accord with certain implementations, this usage pattern can be utilized to shorten the time to get the user to a useful mode of the television set. The TV can remember the typical morning usage state and when the TV is turned off in the evening, it knows that it will likely be tuned to the same state that was used that morning (or a corresponding morning of the week). Hence when the TV is turned on in the morning, before it has fully booted and is responsive to the user commands, the TV could already be tuned to the desired input source, either by pre-tuning or by tuning as soon as the tuner is powered up. The user would not have to wait for the set to finish booting nor wait for the user's input commands since the TV will power up in the state most often desired by the user.

Thus, in accord with certain implementations, a television receives a command to power up from a standby mode. This causes the TV to start a boot process, and while the boot process proceeds. At a that a point in the boot process when the tuner input switch are operative the process simultaneously determines a current time from a real time clock and retrieves a channel and a switch setting from a usage pattern database corresponding to the current time. The tuner is tuned to the channel and the input switch is set. At completion of the boot process the tuner is already tuned to the channel and the input switch is set to the switch setting corresponding the current time so that time to viewing a desired channel is often minimized. The state used to set the input switch and the tuner can be based on the time of day or both time of day and the day of the week.

In the present discussion, a television set is used as an example, however, embodiments consistent with the present invention may be implemented using other television receiver devices such as set top boxes and other devices that do not directly incorporate a display without departing from implementations consistent with the present invention.

Referring now to FIG. 1, a simplified block diagram of a television receiver device, such as a television set, is depicted as 100. This depiction is simplified in that all communication is shown as being carried out through a single bus 104, whereas in a typical television receiver device multiple buses or direct interconnections of various components may be more advantageous. The operation of the system is controlled by a central processor or multiple central processors 108 that interface via the bus to memory and storage 112, which can be any combination of suitable storage devices, such as random access memory (RAM), read only memory (ROM), flash memory, and disc storage, for example. In this example embodiment, the memory 112 includes operating system and boot control routines 116, as well as program and system information protocol (PSIP) tables 120 and a usage pattern database 124, the function of which will be discussed later. A television receiver and tuner circuitry 128 provides for receipt of radiofrequency or Internet TV programming depending up on the configuration of input switches 132, which control the source of content being received by television 100. For digital programming, packet identifier (PID) filters and decoders 136 are utilized to tune to an incoming transport stream carried on a particular frequency and to extract the relevant segments of that transport stream corresponding to a particular television channel to be tuned.

Once the digital television signal is decoded, the decoded video is sent to a display interface 140 for display on a display panel 144, while the audio is decoded and sent to an audio system 148 for conversion to audible sounds. A real time clock 152 is provided for keeping track of current time, as well as day of the week and date, etc. A remote control interface 156 receives signals from a remote controller 160 in order to implement user commands at the television 100. Such commands can include commands to power the television on to a normal operational state or to power the television down to what is commonly considered "off", but in reality is a low power standby mode in which the remote control interface 156 remains active so as to be able to receive power on signals from the remote controller 160, and real time clock 152 is also maintained in an active state so as to continue to keep accurate time. Other components of the system may be placed in a standby, off, or low power state as dictated by the needs to keep various systems active or by the lack of such need.

The usage pattern database can directly store frequency and sets of packet identifiers (PIDs) corresponding to a particular channel to be tuned so that the tuning process does not depend directly upon the program and system information (PSIP) tables (e.g., the program map table PMT and program association table PAT). In this case, the time or time and day of the week is mapped directly to the data needed to tune the tuner and set the input switch. Alternatively, the usage pattern database can point to data in the PSIP tables that store the particulars of frequency and PID sets used to find and decode the channel for a given time or time and day of the week.

Figure 2:
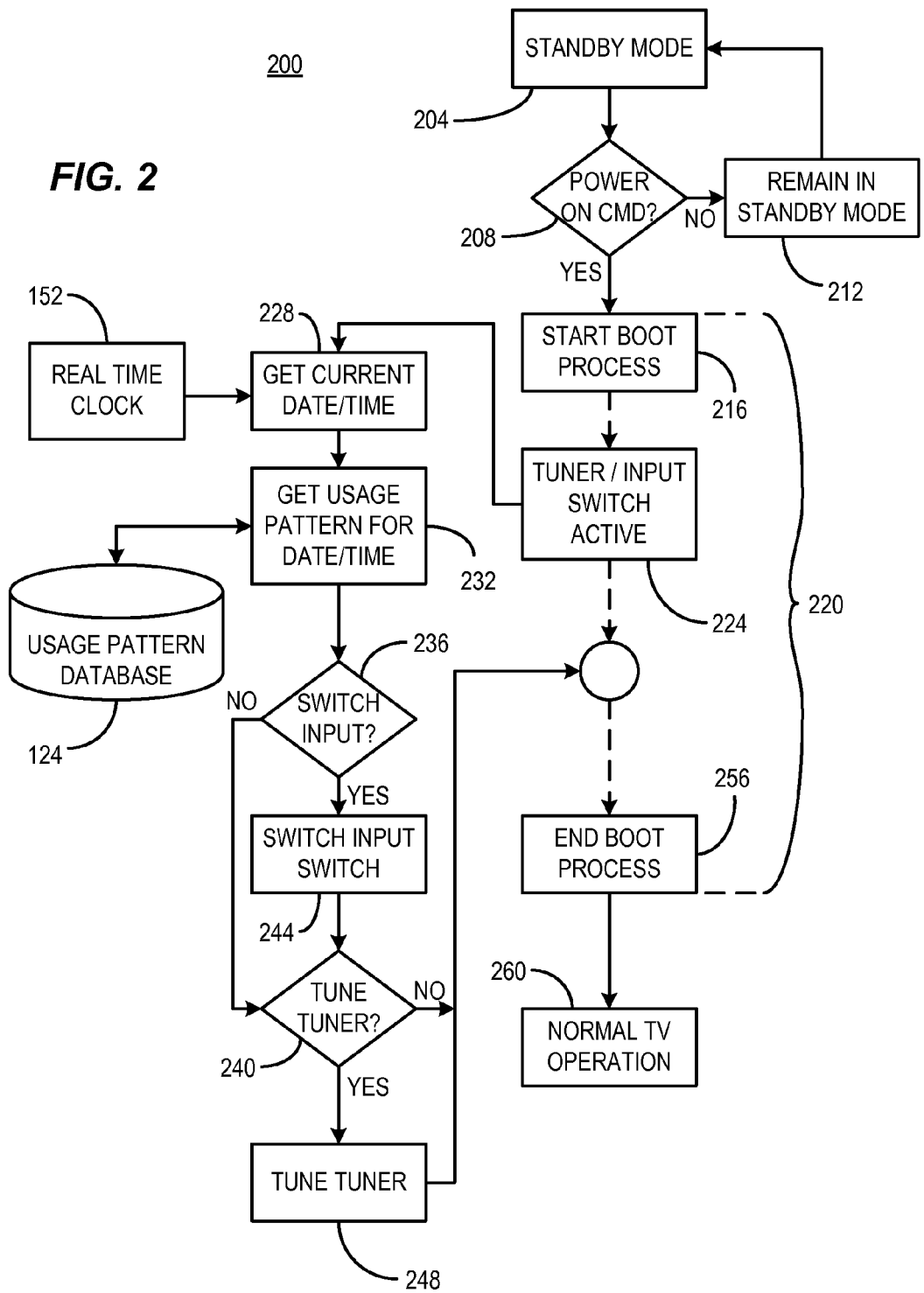
FIG. 2 is an example process depicted in flow chart form for an implementation consistent with certain embodiments of the present invention.

In accordance with one implementation consistent with embodiments of the present invention, a process 200 as shown in FIG. 2 can be utilized wherein the television is in the standby mode 204 awaiting a power on command at 208. So long as a power on command is not received, the television remains in the standby mode at 212 and 204, and the process awaits receipt of a power on command. Upon receipt of such power on command, the television's boot process begins at 216. The boot process spans the functions shown in the bracketed area 220 including all functions which are normally required to get the TV into a fully operational state and get the TV 100 and processor 108 "booted". In accord with this embodiment, at some point in the boot process, the tuner and input switch are placed in an active state at 224. Once the tuner and input switch are in this active state at 224, the process need not await full booting of the system. A parallel process is carried out where in the current time and day of the week are retrieved at 228 from real time clock 152. Once the time and day are known at 228, a usage pattern can be retrieved at 232 from the usage pattern database 124. This usage pattern may include input switch setting and tuner settings as well as other attributes such as volume at a particular time and day as will be discussed later. Once this information is known at 232, the process proceeds to 236 where a determination is made as to whether or not the input needs to be switched. If not, control passes to 240, but if a switch operation needs to be carried out on the input switch, then the input switch is switched at 244. Control then passes from 244 to 240 where a determination is made as to whether a new channel is to be selected. This channel is then selected at 240, and the tuner is tuned to this channel at 248.

In the above process, the usage pattern database 124 is used to determine what channel and what input switch setting a user would normally utilize at a particular time of day or a particular time of a particular day of the week. Usage patterns are generally rather simple as discussed above, so prediction of a channel that a user will desire at a particular time and day of the week is relatively reliable in most instances. However, in the event the TV is turned on at a time of day that does not correspond to any known usage pattern, the processor can refer to the Electronic Programming Guide's (EPG's) recording schedule and if a program has been scheduled for recording, the TV can switch channels and inputs to the channel being recorded automatically. If there is no other resort, the last channel tuned can be used. Other variations will occur to those skilled in the art upon consideration of these teachings.

Once this information is known, the process from 228 to 248 can be carried out in parallel with the booting process 220 so that the user does not have to await sequential tuning and boot operations only to have to subsequently retune the tuner. The tuner in effect will be tuned to a likely channel for the particular time of day and day of the week, as determined by 228. If no tuning is necessary at 240 or if the tuner is tuned at 248, full control turns back to the boot process at whatever stage it is in leaving the tuner and input switches set to a likely setting for the particular user's usage pattern. Meanwhile, process 220 proceeds through carrying out other boot operations until the end of the boot process is reached at 256. Once the end of the boot process is reached, normal operation of the television can proceed at 260 and the television will begin operation in the mode of being tuned to the most common tuned channel via the most common input for a particular time of day and day of week.

Figure 3:
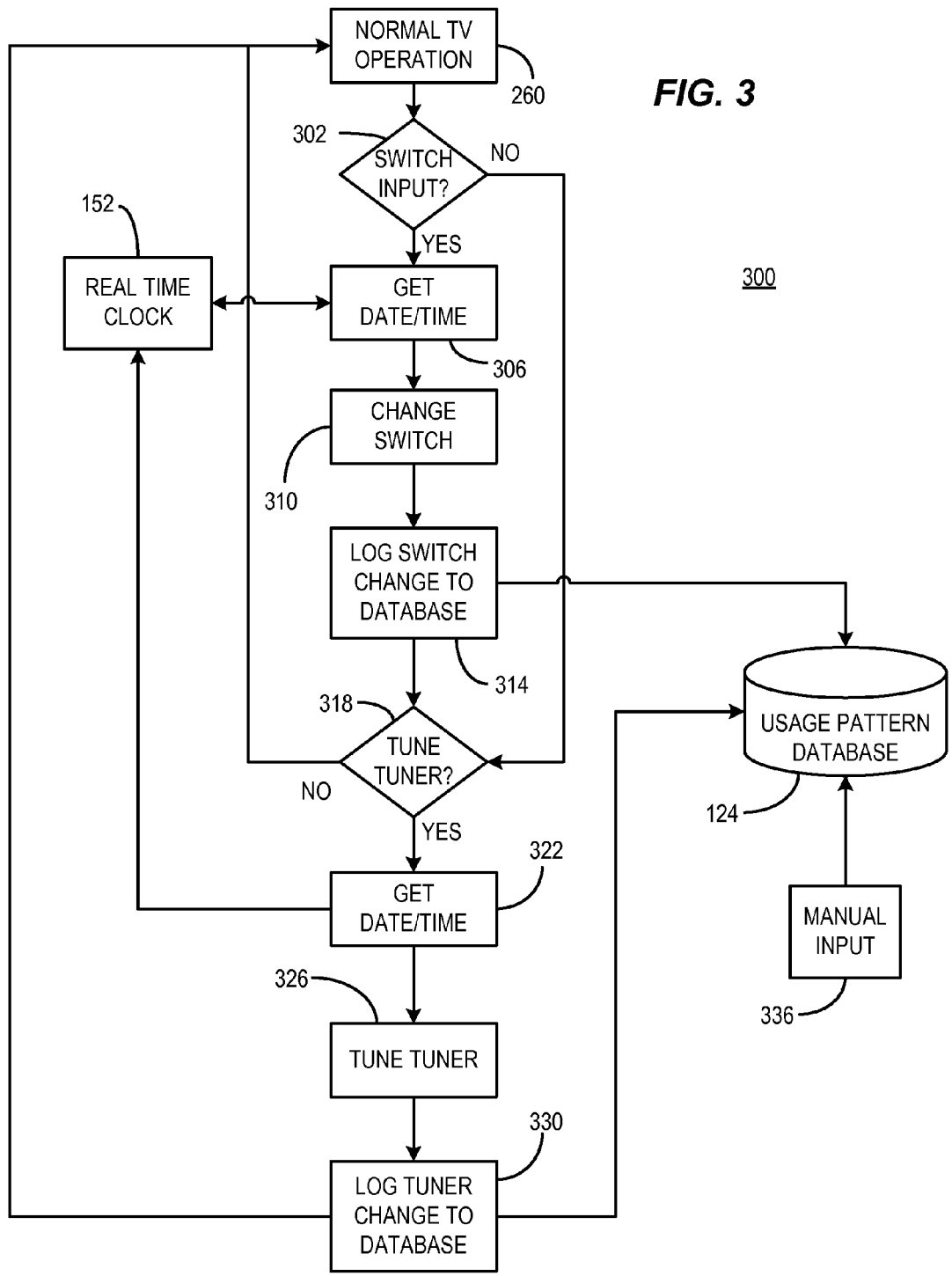
FIG. 3 is an example process depicted in flow chart form for an implementation consistent with certain embodiments of the present invention.

In order to carry out the operation just described, a usage pattern database 124 is maintained, as described in the process 300 of FIG. 3. During normal television operation at 260, whenever an input is switched at 302, the date (day of week) and time is retrieved from the real time clock 152 at 306. If a switch setting is to be changed, such change is implemented at 310, then the switch change is logged to usage pattern database 124 at 314. In a similar manner, when the tuner is changed to change channels at 318, the date and time are retrieved at 322 from real time clock 152, and the tuner is tuned at 326. This change in tuner setting is logged to the database at 330 and control returns to normal TV operation at 260 with the tuner and/or switch having been set to a new setting. If the input switch is not switched at 302 and the tuner is not adjusted at 318, control also returns to 260 to await such changes. It is also noted that the usage pattern database 124 in certain implementations may be modified manually via manual input during any time of operation to the television set at 336.

When utilizing any of the techniques disclosed herein, it is also possible to record a volume setting in the usage pattern database for use when pre-tuning to a particular input or channel. This permits the TV to not only adjust the channel and input setting of the TV to a channel or input that is consistent with the TV's usage pattern, but also to adjust the audio volume accordingly. In this manner, it is possible to automatically compensate for variations in audio from channel to channel, input to input, and listener preference. This change in volume setting can be implemented upon changing the switch setting at 310 and/or tuning the tuner at 326 in process 300 or in a decision loop process similar to that disclosed in connection with the input switch adjustment or tuner adjustment as depicted in process 300.

Figure 4:
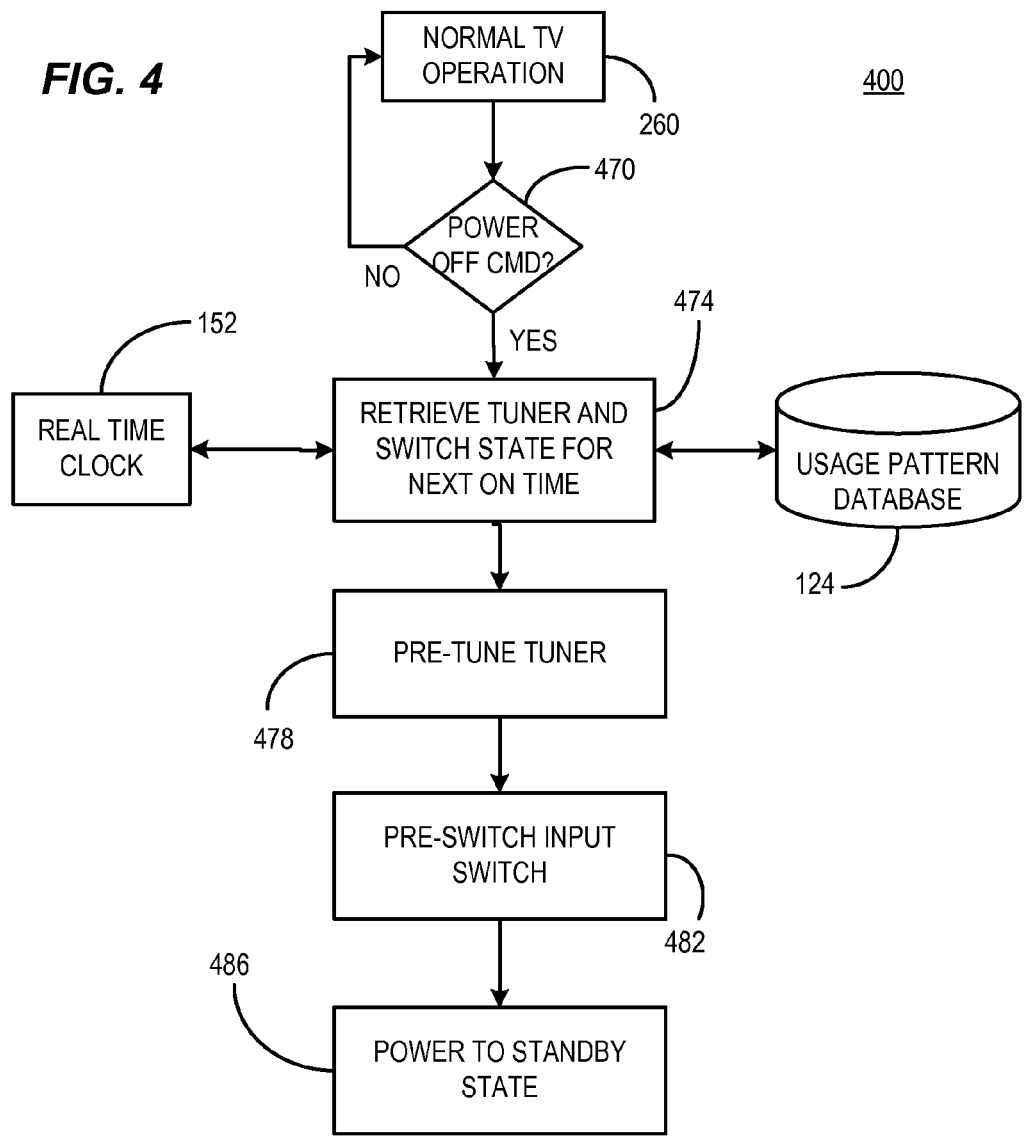
FIG. 4 is an example process depicted in flow chart form of another implementation consistent with certain embodiments of the present invention.

Referring now to FIG. 4, an alternative implementation 400 is depicted wherein rather than parallel processing the tuner and input switch setting during the boot process, the tuner and input switch are preloaded with appropriate channel and switch settings upon power down of the television set to a standby mode. In accordance with this implementation, during normal TV operation at 260 if an off command is received (bearing in mind that off command generally takes the television to a standby mode) at 470, the processor or processors retrieve tuner and switch state information from the usage pattern database 124 after retrieving the current time from the real time clock 152 at 474. The information retrieved, however, is for the anticipated next turn-on time for the television set. This can be deduced from the current time, and the usage pattern database, which should accurately predict for the most part based on the viewers' usage patterns, what time, channel, and input will be used when the television is next turned on. Based on this information, the tuner is pre-tuned at 478, and the input switch is pre-switched at 482 before power is completely taken to the standby state at 486. This can also be implemented by preloading the information on channel and switch setting and the actual tuning and switch changes can take place in parallel with the boot process when the TV is turned on.

It is also possible to automatically compensate for variations in audio from channel to channel, input to input, and listener preference in the present implementation. This change in volume setting can be implemented upon pre-tuning the tuner at 478 and/or changing the switch setting at 482 in process 400 or in a separate sequential function (not shown) similar to that disclosed in connection with the input switch adjustment or tuner adjustment as depicted in process 400.

Figure 5:
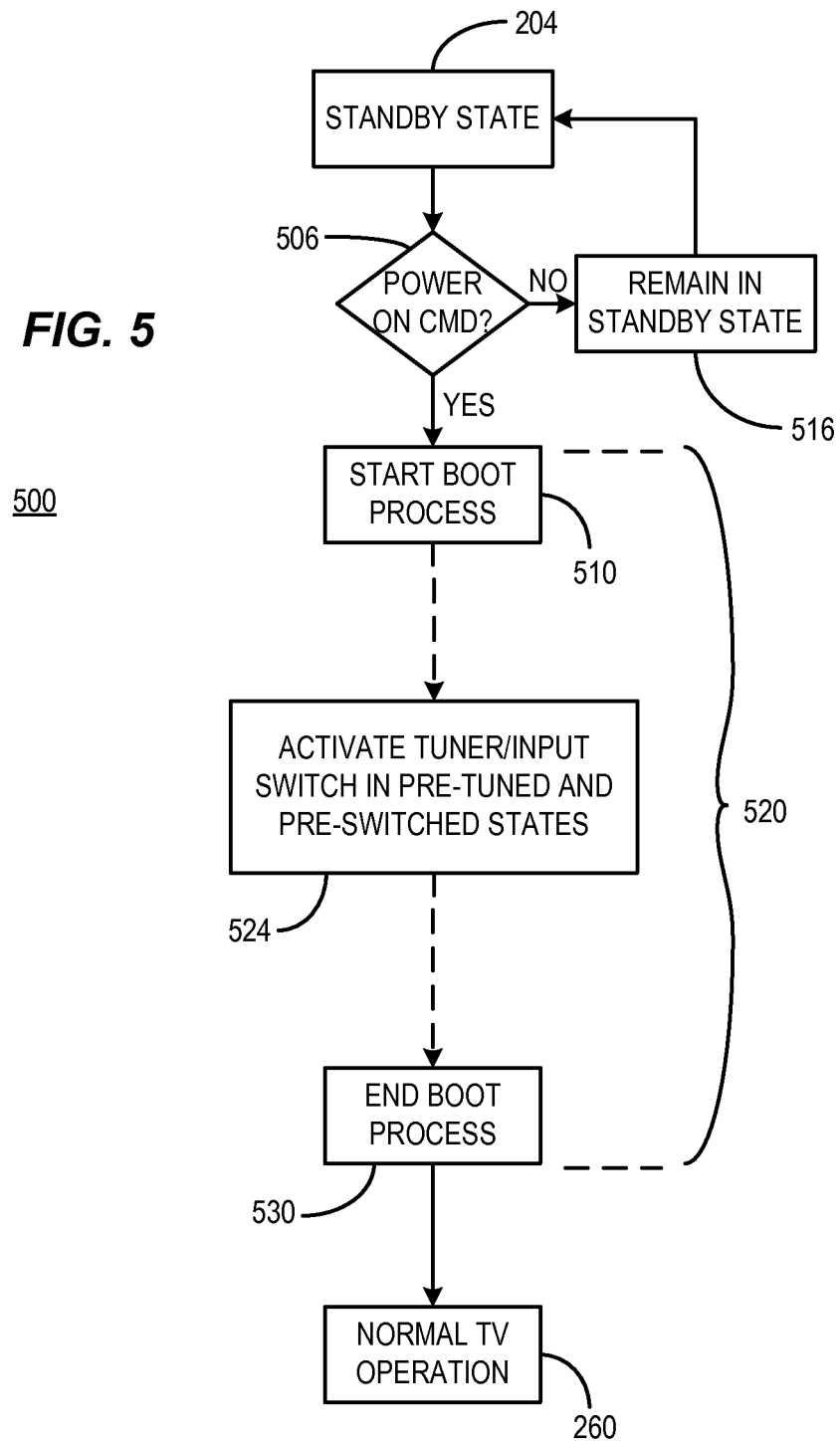
FIG. 5 is an example process depicted in flow chart form of another implementation consistent with certain embodiments of the present invention.

Referring now to FIG. 5, process 500 begins with the television in the standby mode 204. When a power on command is received at 506, the boot process starts at 510. If no power on command is received at 506, the television remains in the standby state at 516 awaiting receipt of the power on command. Once the boot process begins at 510, the process extends through the actions depicted as 520. During this boot process at 524, the tuner and input switch are activated using the pre-tuned and pre-switched states discussed in connection with process 400 and possibly including audio volume settings or other TV attributes. When the boot process completes at 530, normal TV operation begins at 260 on the channel and input determined by the pre-tuning at 478 and pre-switching at 482 as well as possibly pre-setting the audio volume or other television attributes. In this manner, the TV begins operation in a state that is predicted with relatively high confidence to be the state that the user is likely to desire based on day of week and time of day. The tuning of the tuner involves both selection of a frequency and selection of packet identifiers (PIDs) used to tune to the correct frequency and to filter the correct PIDs used to extract a particular program from the transport stream.

Thus, in accord with certain implementations, a method of starting a television involves receiving a command to power up the television from a standby mode; starting a television boot process, and while the boot process proceeds: determining that a point in the boot process when a television tuner is operative and an input switch is operative has been reached; determining a current time from a real time clock; retrieving a channel and a switch setting from a usage pattern database corresponding to the current time; tuning the tuner to the channel and selecting the switch setting at an input switch; and completing the boot process so that at the end of the boot process the tuner is already tuned to the channel and the input switch is set to the switch setting corresponding the current time.

A tangible non-transitory computer readable electronic storage medium storing instructions which, when executed on one or more programmed processors, carry out a method involving starting a television boot process, and while the boot process proceeds: determining that a point in the boot process when a television tuner is operative and an input switch is operative has been reached; determining a current time from a real time clock; retrieving a channel and a switch setting from a usage pattern database corresponding to the current time; tuning the tuner to the channel and selecting the switch setting at an input switch; and completing the boot process so that at the end of the boot process the tuner is already tuned to the channel and the input switch is set to the switch setting corresponding the current time.

A television receiver device has a remote command receiver configured to receive a command to power up the television receiver device from a standby mode. A memory stores a usage pattern database. A real time clock, a television tuner device and an input switch are provided. A programmed processor is programmed to: start a television boot process, and while the boot process proceeds: determine that a point in the boot process when the television tuner device is operative and the input switch is operative has been reached; determine a current time from the real time clock; retrieve a channel and a switch setting from the usage pattern database corresponding to the current time; tune the tuner to the channel and selecting the switch setting at an input switch; and complete the boot process so that at the end of the boot process the tuner is already tuned to the channel and the input switch is set to the switch setting corresponding the current time.

In certain implementations, determining the current time further involves determining a current day of the week. In certain implementations, retrieving the channel and the switch setting from the usage pattern database further comprises retrieving the channel and switch setting corresponding to the current time on the current day of the week. In certain implementations, the tuning comprises tuning the tuner to a specified frequency and setting packet filters to select packets having a specified set of packet identifiers from a transport stream corresponding to the channel. In certain implementations, the specified frequency and set of packet identifiers is stored in the usage pattern database. In certain implementations, the specified frequency and set of packet identifiers is stored in program and system information protocol (PSIP) tables that are indexed in the usage pattern database. In certain implementations, an audio volume setting is retrieved from the usage pattern database and the audio volume is set to a level determined by the usage pattern database so that at the end of the boot process the audio volume is set to a value corresponding the current time. In certain implementations, the channel and switch setting correspond to a channel and switch setting for a recording that corresponds to the current time.

Another method of starting a television involves receiving a command to power down the television to a standby mode; prior to fully entering the standby mode: determining a next time of operation of the television from a usage pattern database with reference to a real time clock; retrieving a channel and a switch setting from a usage pattern database corresponding to the next time of operation of the television; pre-tuning the tuner to the channel and selecting the switch setting at an input switch; and completing entry of the television to the standby mode.

In certain implementations, the a television boot process is started and upon completing the boot process, at the end of the boot process the tuner is already tuned to the channel and the input switch is set to the switch setting corresponding the next time of operation. In certain implementations, the process further involves retrieving an audio volume setting from the usage pattern database and pre-setting the audio volume to a level determined by the usage pattern database. In certain implementations, the channel and switch setting correspond to a channel and switch setting for a recording that corresponds to the current time.

A tangible non-transitory computer readable electronic storage medium storing instructions which, when executed on one or more programmed processors, carry out a method that involves starting a power down process to power the television to a standby mode; prior to fully entering the standby mode: determining a next time of operation of the television from a usage pattern database; retrieving a channel and a switch setting from a usage pattern database corresponding to the next time of operation of the television; pre-tuning the tuner to the channel and selecting the switch setting at an input switch; and completing entry of the television to the standby mode.

A television receiver device has a remote command receiver configured to receive a command to power up the television receiver device from a standby mode. A memory stores a usage pattern database. A real time clock, a television tuner device, and an input switch are provided. A programmed processor is programmed to: receive a command to power down the television to a standby mode; prior to fully entering the standby mode: determine a next time of operation of the television from a usage pattern database; retrieve a channel and a switch setting from a usage pattern database corresponding to the next time of operation of the television;

pre-tune the tuner to the channel and selecting the switch setting at an input switch; and complete entry of the television to the standby mode.

In certain implementations, a television boot process is started and upon completing the boot process the tuner is already tuned to the channel and the input switch is set to the switch setting corresponding the next time of operation. In certain implementations, determining the next time further comprises determining a day of the week. In certain implementations, retrieving the channel and the switch setting from the usage pattern database further comprises retrieving the channel and switch setting corresponding to the next time of operation including the day of the week. In certain implementations, the pre-tuning comprises tuning the tuner to a specified frequency and setting packet filters to select packets having a specified set of packet identifiers from a transport stream corresponding to the channel. In certain implementations, the specified frequency and set of packet identifiers is stored in the usage pattern database. In certain implementations, the specified frequency and set of packet identifiers is stored in program and system information protocol (PSIP) tables that are indexed in the usage pattern database. In certain implementations, the processor retrieves an audio volume setting from the usage pattern database and sets the audio volume to a level determined by the usage pattern database so that at the end of the boot process the audio volume is set to a value corresponding the current time. In certain implementations, the channel and switch setting correspond to a channel and switch setting for a recording that corresponds to the current time.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium including non-transitory storage media, where the term non-transitory is intended only to preclude propagating waves and not storage that can be rewritten or storage that loses its stored information when power is removed. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of starting a television, comprising:
   receiving a command to power down the television to a standby mode;
   prior to fully entering the standby mode:
      determining a next time of operation of the television from a usage pattern database with reference to a real time clock;
      retrieving a channel and a switch setting from a usage pattern database corresponding to the next time of operation of the television;
      pre-tuning the tuner to the channel and selecting the switch setting at an input switch; and
   completing entry of the television to the standby mode.

2. The method according to claim 1, further comprising:
   starting a television boot process; and
   completing the boot process so that at the end of the boot process the tuner is already tuned to the channel and the input switch is set to the switch setting corresponding the next time of operation.

3. The method according to claim 1, where determining the next time further comprises determining a day of the week.

4. The method according to claim 3, where retrieving the channel and the switch setting from the usage pattern database further comprises retrieving the channel and switch setting corresponding to the next time of operation including the day of the week.

5. The method according to claim 1, where the pre-tuning comprises tuning the tuner to a specified frequency and setting packet filters to select packets having a specified set of packet identifiers from a transport stream corresponding to the channel.

6. The method according to claim 5, where the specified frequency and set of packet identifiers is stored in the usage pattern database.

7. The method according to claim 5, where the specified frequency and set of packet identifiers is stored in program and system information protocol (PSIP) tables that are indexed in the usage pattern database.

8. The method according to claim 1, further comprising retrieving an audio volume setting from the usage pattern database and pre-setting the audio volume to a level determined by the usage pattern database.

9. The method according to claim 1, where the channel and switch setting correspond to a channel and switch setting for a recording that corresponds to the current time.

10. A tangible non-transitory computer readable electronic storage medium storing instructions which, when executed on one or more programmed processors, carry out a method comprising:
    starting a power down process to power the television to a standby mode;
    prior to fully entering the standby mode:
       determining a next time of operation of the television from a usage pattern database;
       retrieving a channel and a switch setting from a usage pattern database corresponding to the next time of operation of the television;
       pre-tuning the tuner to the channel and selecting the switch setting at an input switch; and
    completing entry of the television to the standby mode.

11. The medium according to claim 10, further comprising:
    starting a television boot process; and
    completing the boot process so that at the end of the boot process the tuner is already tuned to the channel and the input switch is set to the switch setting corresponding the next time of operation.

12. The medium according to claim 10, where determining the next time further comprises determining a day of the week.

13. The medium according to claim 10, where retrieving the channel and the switch setting from the usage pattern database further comprises retrieving the channel and switch setting corresponding to the next time of operation including the day of the week.

14. The medium according to claim 10, where the pre-tuning comprises tuning the tuner to a specified frequency and setting packet filters to select packets having a specified set of packet identifiers from a transport stream corresponding to the channel.

15. The medium according to claim 14, where the specified frequency and set of packet identifiers is stored in the usage pattern database.

16. The medium according to claim 14, where the specified frequency and set of packet identifiers is stored in program and system information protocol (PSIP) tables that are indexed in the usage pattern database.

17. A television receiver device, comprising:
- a remote command receiver configured to receive a command to power down the television receiver device to a standby mode;
- a memory storing a usage pattern database;
- a real time clock;
- a television tuner device;
- an input switch;
- a programmed processor programmed to:
  - receive a command to power down the television to a standby mode;
  - prior to fully entering the standby mode:
  - determine a next time of operation of the television from a usage pattern database;
  - retrieve a channel and a switch setting from a usage pattern database corresponding to the next time of operation of the television;
  - pre-tune the tuner to the channel and selecting the switch setting at an input switch; and
  - complete entry of the television to the standby mode.

18. The device according to claim 17, further comprising:
- starting a television boot process; and
- completing the boot process so that at the end of the boot process the tuner is already tuned to the channel and the input switch is set to the switch setting corresponding the next time of operation.

19. The device according to claim 17, where determining the next time further comprises determining a day of the week.

20. The device according to claim 17, where retrieving the channel and the switch setting from the usage pattern database further comprises retrieving the channel and switch setting corresponding to the next time of operation including the day of the week.

21. The device according to claim 17, where the pre-tuning comprises tuning the tuner to a specified frequency and setting packet filters to select packets having a specified set of packet identifiers from a transport stream corresponding to the channel.

22. The device according to claim 21, where the specified frequency and set of packet identifiers is stored in the usage pattern database.

23. The device according to claim 21, where the specified frequency and set of packet identifiers is stored in program and system information protocol (PSIP) tables that are indexed in the usage pattern database.

24. The device according to claim 21, where the processor retrieves an audio volume setting from the usage pattern database and sets the audio volume to a level determined by the usage pattern database so that at the end of the boot process the audio volume is set to a value corresponding the current time.

25. The device according to claim 21, where the channel and switch setting correspond to a channel and switch setting for a recording that corresponds to the current time.

* * * * *